United States Patent [19]

Juen et al.

[11] Patent Number: 5,574,073
[45] Date of Patent: Nov. 12, 1996

[54] CURABLE SILICONE COMPOSITIONS WHICH ARE FOAMS OR ELASTOMERS

[75] Inventors: Donnie R. Juen, Sanford; William R. Nicholson, Midland; Lawrence J. Rapson, Bay City, all of Mich.

[73] Assignee: Dow Corning Corporation, Midland, Mich.

[21] Appl. No.: 587,625

[22] Filed: Jan. 17, 1996

[51] Int. Cl.$^6$ .................................................. C08J 9/04
[52] U.S. Cl. .......................... 521/134; 521/122; 521/124; 521/154; 521/117; 528/15
[58] Field of Search ..................... 521/154, 134, 521/124, 122; 528/15

[56] References Cited

U.S. PATENT DOCUMENTS

| | | | |
|---|---|---|---|
| 3,419,593 | 12/1968 | Willing | 260/448.2 |
| 3,923,705 | 12/1975 | Smith | 260/2.5 |
| 4,487,906 | 12/1984 | Kniege et al. | 528/15 |
| 4,590,222 | 5/1986 | Bauman | 521/88 |
| 5,011,865 | 4/1991 | Johnson | 521/82 |
| 5,162,397 | 10/1992 | Descamps et al. | 523/219 |
| 5,279,894 | 1/1994 | Hoffman et al. | 428/305.5 |
| 5,414,023 | 5/1995 | Loiselle et al. | 521/88 |

*Primary Examiner*—Morton Foelak
*Attorney, Agent, or Firm*—Robert L. McKellar

[57] ABSTRACT

What is disclosed herein relates to curable silicone compositions which provide high strength foams or elastomers. These foams or elastomers have high strength properties which are provided by a combination of non-resinous organopolysiloxanes as the base polymer. The high strength properties are better than the high strength properties of cured silicone compositions where only one non-resinous organopolysiloxane polymer type is employed. These compositions have the added benefit of being less expensive than resin based formulations.

7 Claims, No Drawings

CURABLE SILICONE COMPOSITIONS WHICH ARE FOAMS OR ELASTOMERS

BACKGROUND OF THE INVENTION

This invention relates to curable silicone compositions which provide high strength foams or elastomers. These foams or elastomers have high strength properties which are provided by a combination of organopolysiloxanes as the base polymer. The high strength properties are comparable to or better than the high strength properties of cured silicone compositions found in the art, but have the benefit of being less expensive to prepare.

Foamable compositions and curable elastomer forming compositions comprising a curable liquid hydroxyl-containing polyorgansiloxane base polymer, an organohydrogensiloxane crosslinker, and a curing catalyst are well-known in the art. Foamable compositions are known for example from U.S. Pat. No. 3,923,705, which issued Dec. 2, 1975 to Smith, which discloses basic foam compositions and methods and U.S. Pat. No. 5,414,023, which issued on May 9, 1995 in the name of Loiselle, et al, wherein the inventors therein recite numerous citations of patent and journal literature containing such information.

Patents dealing with such curable elastomer forming compositions are U.S. Pat. No. 5,279,894, which issued on Jan. 18, 1994 to Hoffman, et al, in which there is additionally used low viscosity dimethylvinyl chain-stopped (i.e. "terminal end blocked") dimethyl polysiloxane and alumina trihydrate to provide non-flammable adhesive products. Hoffman also discloses the additional use of vinyl-containing resinous siloxanes to provide the adhesive properties.

A patent, U.S. Pat. No. 4,590,222, which issued May 20, 1986 to Bauman deals with a vinyl-containing base polymer, a silicon hydride-containing crosslinker, a silanol terminated polydimethylsiloxane and also uses a benzene soluble, vinyl-containing siloxane resin as a profoamer.

Additional patents which deal with curable elastomer forming materials include U.S. Pat. No. 4,487,906, which issued Dec. 11, 1984 to Kniege, et al.; Bauman; U.S. Pat. No. 5,011,865 which issued Apr. 30, 1991 to Johnson, and U.S. Pat. No. 5,162,397 which issued Nov. 10, 1992 to Descamps. These latter four patents are included for what they teach about prior art curable siloxane elastomer forming compositions, but are considered to be irrelevant to the improved compositions of the instant invention.

The most pertinent of the prior art known to the inventors herein is the U.S. Pat. No. 5,279,894 recited supra.

The '894 patent discloses the use of additional siloxane polymers in the composition of the curable elastomer forming compositions, namely, the use of a low viscosity dimethylvinyl chain-stopped dimethyl polysiloxane which allegedly is used as a diluent, and a "branched chain" polymer which is actually a resinous material used to achieve adhesiveness for the composition.

The latter material is often referred-to as "resin reinforced polymer". Such use however does not anticipate the invention disclosed herein, nor make the invention disclosed herein obvious, owing to fact that the so-called "branched chain" polymer is actually a resin and there are no base polymer resinous materials required in the instant invention and there is no suggestion in the '894 patent to combine the specific siloxane materials of the instant invention, in the combinations disclosed herein, to obtain the benefits indicated.

The elastomer forming compositions claimed herein provide high strength elastomers as is shown by increased tensile strength, durometer and modulus, while holding the tear strength relatively constant, while in the foamed materials, higher strength foams can be prepared as is shown by tensile and tear measurements.

SUMMARY OF THE INVENTION

This invention relates to curable silicone compositions which provide high strength foams or elastomers. Such properties are provided by specific combinations of non-resinous vinyl-containing siloxane polymers having high and low molecular weights.

DETAILED DESCRIPTION OF THE INVENTION

This invention relates to high strength curable silicone elastomer and foam forming compositions which are comprised of (A.) a high strength base polymer system which is a combination of (i) a high molecular weight siloxane polymeric material containing vinyl groups only on the terminal ends thereof and, (ii) a second siloxane polymer containing vinyl groups selected from the groups consisting essentially of: a. low molecular weight siloxane polymers having vinyl groups which are located only pendant thereon, b. low molecular weight siloxane polymers having vinyl groups which are located both pendant and on the terminal ends thereof, c. high molecular weight siloxane polymers having vinyl groups which are located only pendant thereon, d. high molecular weight siloxane polymers having vinyl groups which are located both pendant and on the terminal ends thereof, and e. low molecular weight siloxane polymers containing vinyl groups only on the terminal ends thereof; (B.) a silicon-containing crosslinker for the silicone base polymer system, wherein the crosslinker contains at least two —SiH groups per molecule, and (C.), a platinum group catalyst sufficient for curing the silicone composition, whereby an improvement is obtained.

The essence of this invention is the combination of polymers to form the base polymer system, selected from (A) i and any of the polymers from (A) iia-e to provide the enhanced physical properties. For purposes of this invention, any reference to molecular weight in this specification and claims is based on grams/mole.

The crosslinking, or curing agent (B) of this invention is one which contains at least one organohydrogensiloxane that supplies the silicon-bonded hydrogen atoms required to cure the composition. The organohydrogensiloxane can have a linear or branched structure, and can be selected from homopolymers, copolymers or mixtures of these types of polymers.

A preferred linear type of organohydrogensiloxane has a viscosity of from 0.01 to 10 Pa.s at 25° and comprises dialkylsiloxane and alkylhydrogensiloxane units with tri-alkylsiloxy terminal units. The alkyl radicals contain from 1 to 4 carbon atoms, and are most preferably methyl.

Preferred compositions contain two types of organohydrogensiloxanes, one of which is a polymethylhydrogensiloxane and the second a copolymer containing methylhydrogensiloxane and dimethylsiloxane units.

The relative amounts of each of the components A. and B. in the present compositions is a weight ratio of from 20:1 to 1:10. A preferred ratio is from 16:1 to 4:1 and the most preferred ratio is 8:1.

Component C of this invention is a metal from the platinum group of the periodic table or a compound of such a metal. These metals include platinum, palladium and rhodium. Platinum and platinum compounds are preferred based on the high activity level of these catalysts in hydrosilation reactions. Examples of preferred curing catalysts include but are not limited to platinum black, platinum metal on various solid supports, chloroplatinic acid, alcohol solutions of chloroplatinic acid, and complexes of chloroplatinic acid with liquid ethylenically unsaturated compounds such as olefins and organosiloxanes containing ethylenically unsaturated hydrocarbon radicals bonded to silicon. Complexes of chloroplatinic acid with the aforementioned organosiloxanes containing ethylenically unsaturated hydrocarbon radicals are described in U.S. Pat. No. 3,419,593, which issued to David N. Willing on Dec. 31, 1968. The relevant portions of this patent are incorporated herein by reference as a teaching of preferred catalysts.

The concentration of ingredient C in the present compositions is equivalent to a platinum concentration of from 0.1 to 500 parts by weight of platinum metal, preferably from 5 to 100 parts by weight of platinum metal, per million parts (ppm), based on the combined weight of ingredients A and B.

Curing does not proceed satisfactorily at below 0.1 ppm of platinum, while using more than 500 ppm results in no appreciable increase in cure rate, and is therefore uneconomical.

Components A(i) and A(ii)a-e are available polysiloxanes and methods for their preparation are known to those skilled in the art and some of those methods are set forth in the U.S. Patents cited supra. It is not deemed necessary, therefore, to set forth in intimate detail, the preparation of such materials in this specification.

Components A(i) are high molecular weight diorganopolysiloxanes which have essentially all of the vinyl in the molecule located on both of the terminal ends. By the use of the word "essentially", it is meant that the polymers have little or no vinyl groups which are pendant on the siloxane chain of such molecules. Such polysiloxanes are primarily dialkyl substituted diorganopolysiloxanes having such diverse end blocking groups as

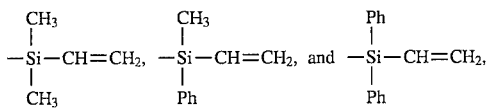

and the like, wherein Ph is the phenyl radical.

Preferred for this invention are the dimethylvinylsiloxy and methylphenylvinylsiloxy endblocking groups, while most preferred for this invention is the dimethylvinylsiloxy endblocking. It should be noted that for purposes of this invention, the term "high molecular weight" of A(i) refers to a molecular weight in the range of 30,000 to 1,000,000 having vinyl contents in the range of 0.01 to 0.16 weight percent.

The components A(ii)a through e of this invention, the second siloxane polymers containing vinyl groups, are well-known siloxanes and are selected from the groups consisting essentially of: a. low molecular weight siloxane polymers having vinyl groups which are located only pendant on the siloxane chain; b. low molecular weight siloxane polymers having vinyl groups which are located both pendant on the siloxane chain and on the terminal ends thereof; c. high molecular weight siloxane polymers having vinyl groups which are located only pendant on the siloxane chains; d. high molecular weight siloxane polymers having vinyl groups which are located both pendant on the siloxane chain and on the terminal ends thereof, and e. low molecular weight siloxane polymers containing vinyl groups only on the terminal ends thereof.

For illustration purposes, the following types of polymers are among those intended for the definitions supra:

A(i) is

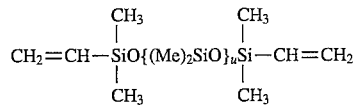

wherein Me is the methyl radical and u has a value such that it provides a molecular weight in the range set forth for A(i), supra.

A(i)' is within the molecular weight range stated in A(i) but u has a value such that it provides an example on the lower end of the molecular weight range of A(i), on the order of about 38,000 g/mole.

A(ii)a

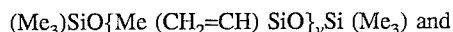

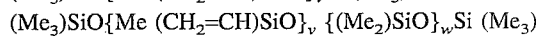

wherein Me is the methyl radical and v and w have values such that they provide a molecular weight in the range set forth for A(ii)a, infra.

A(ii)b

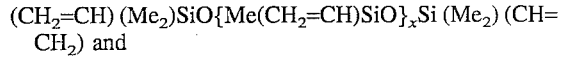

wherein Me is the methyl radical and x and y have values such that they provide a molecular weight in the range set forth for A(ii)b, infra.

A(ii)c

The types of molecules are those set forth for A(ii)a, supra, except the values of v and w are such that they provide a molecular weight in the range set forth for A(ii)c, infra.

A(ii)d

The type of molecules are those set forth for A(ii)b, supra, except the values of x and y are such that they provide a molecular weight in the range set forth for A(ii)d, infra.

A(ii)e

The type of molecules are those set forth for A(i), supra, except the value of u is such that it provides a molecular weight in the range set forth for A(ii)e, infra.

With regard to the A(ii)a and b polymers, the molecular weight ranges from 272 to 40,000 and the vinyl contents range from 0.2 to 55.1 weight percent. Further, the molecular weight range for A(ii)c and A(ii)d polymers is from 40,000 to 1,000,000 and the vinyl content ranges from 0.01 to 55.1 weight percent. And, finally, the molecular weight range for A(ii)e ranges from 186 to 30,000 and the vinyl content ranges from 0.18 to 14.5.

The amount of the A(i) and the particular A(ii) polymers to be used is dependent on the particular combination used. For example, the weight ratio of A(i) to A(ii)a or A(ii)b is essentially the same and is from 99.7: 0.3 to 5: 95. A preferred ratio is from 95: 5 to 30:70, and the most preferred ratio is from 90:10 to 60:40.

For the combinations of A(i) to A(ii)c and A(ii)d, the weight ratio is from 95: 5 to 5: 95, a preferred ratio being from 90: 10 to 30:70, and the most preferred ratio being from 85:15 to 60:40.

And finally, for the combination of A(i) to A(ii)e, the ratio is from 99.7: 0.3 to 5: 95. A more effective ratio is from 95: 5 to 30:70 and the most preferred is a ratio of 90:10 to 60:40.

Other optional ingredients can be used with the compositions of this invention provided they do not interfere with cure or destroy the enhanced physical properties of the final cured materials.

Such optional materials which can modify other properties of the cured materials, or can aid in the preparation of them, can be for example, finely divided reinforcing and non-reinforcing mineral fillers such as quartz and calcium carbonate; metal oxides such as alumina, hydrated alumina, ferric oxide and titanium dioxide; pigments such as carbon black and zinc oxide; organic pigments and dyes, antioxidants, heat stabilizers, ultraviolet stabilizers, flame retarding agents and catalyst inhibitors such as cyclic methylvinylsiloxanes to increase the working time of the curable composition, blowing agents to form foams, and the like.

Often used optional ingredients in the present compositions are resinous organosiloxane copolymers containing triorganosiloxy and $SiO_{4/2}$ units. The triorganosiloxy units in this type of copolymer can be represented by the formula $R^3{}_3SiO_{1/2}$, wherein $R^3$ represents a monovalent unsubstituted or substituted hydrocarbon radical. In preferred copolymers the hydrocarbon radicals represented by $R^3$ are a combination of lower alkyl, most preferably methyl. The molar ratio of triorganosiloxy units to $SiO_{4/2}$ units in the copolymer is typically from 0.5 to 1.6, inclusive. The copolymer constitutes up to 30 percent of the combined weight of the copolymer and curable composition. At least a portion of the silicon atoms in the copolymer contain ethylenically unsaturated hydrocarbon radicals such as vinyl.

The curable compositions of this invention are prepared by blending the ingredients of the compositions to homogeneity. The present compositions begin to cure, and foam, if a blowing agent has been utilized, when the ingredients are combined in this manner. If it is desired to store the compositions prior to curing and/or foaming them, this can be achieved by packaging the ingredients in two or more containers with at least the organohydrogensiloxane and curing catalyst in separate containers. The present invention compositions lend themselves to being packaged in three or four, or more separate containers for blending by mechanical equipment.

Both the curing and foaming reactions are accelerated by heating the curable compositions. Reaction temperatures for the foam and the elastomers from about 55° F. to about 200° F. are preferred. Most preferred is a temperature of about 65° F. to about 90° F. The time required for curing and foaming of the present compositions is typically from 0.5 to 60 minutes, based on the reactivity of the ingredients and the temperatures used, and about 0.5 to 24 hours for the elastomers.

The following examples describe preferred embodiments of the present compositions and should not be interpreted as limiting the scope of the invention defined in the accompanying claims. All parts and percentages in the examples are by weight and viscosities were measured at 25° C.

The following materials were used in the examples.

Component (A)i=$ViMe_2 SiO(Me_2 SiO)_x SiMe_2 Vi$ having a viscosity of about 50,000 to 70,000, a high molecular weight vinyl terminated polymer.

Component A(ii)b=$ViMe_2 SiO(MeViSiO)_a (Me_2 SiO)_b SiMe_2 Vi$ which has a viscosity of about 350 Cps at 25° C., a degree of polymerization of about 128, a molecular weight of about 9500 g/mole and a weight percent vinyl content of about 1.18 and which is a low molecular weight vinyl pendant and vinyl terminated polymer.

Component A(ii)c=$Me_3 SiO(Me_2 SiO)_x (MeViSiO)_y SiMe_3$ having about 0.5 weight percent vinyl content and a viscosity of about 45,000 cps at 25° C. and which is a high molecular weight vinyl pendant polymer.

Component A(ii)e=$ViMe_2 SiO(Me_2 SiO)_x SiMe_2 Vi$ having a viscosity of about 450 Cps at 25° C. which is a low molecular weight vinyl terminated polymer.

Component B(i)=A material that is of the type prepared by the processes as set forth in U.S. Pat. No. 4,322,518 and which has an SiH content of about 0.76 weight percent.

Component B(ii) =$Me_3 SiO(Me_2 SiO)_x(MeHSiO)_y SiMe_3$ having about 0.76 weight percent SiH, x is about 3 and y is about 5.

Component C=a hydrosilation catalyst as described above.

Component D=benzyl alcohol as a blowing agent.

Component E=5μ quartz filler.

Component F=a commercial fire retardant.

Component G=an inhibitor which is $(MeViSiO)x$ which is a cyclic siloxane tetramer.

Example 1 (FOAM)

Using the above named materials, the samples were fashioned by preparing a first composition by mixing together components A(i) and one or more of the components A(ii) with components, C, D, E, and F. This is the base, part 1. A second composition was prepared by mixing together one or more components B, a small amount of Ai as a carrier, and in some cases, an inhibitor (G) for the SiH to Vinyl addition reaction and this is the curing agent, part 2.

Samples were prepared for testing by hand mixing base and curing agent at a 10:1 ratio for sixty seconds. The foam was then poured on to sheet polyester and then sandwiched between another sheet of polyester. The desired thickness was achieved by pushing the material out using a non-flexible tube supported by shims. The sheeted foam was then cured for five minutes at fifty-four degrees centigrade then four minutes at 100 degrees C. It was then post cured for ten minutes at 190° C. and allowed to return to room temperature. A tensiometer (Monsanto T-2000, Monsanto Company, Monsanto Instruments & Equipment, Akron Ohio 44314) was used to test tensile, tear and elongation. Tensile bars were prepared using tensile die A. Tear bars were prepared with a tear C die. All bars were pulled at twenty inches per minute. (CTM 0137A, based on ASTM D 412). This testing also gave the elongation results. Sheet density was determined by cutting a 3"×3" square from near the center of the sheeted foam. The thickness of the foam was then measured five (5) times across the sheet. Measurements were taken at the four corners and the center of the sample, using a Sylvac system digital micrometer to 0.001 mm. The weight was measured on a Mettler scale to 0.01 g. Density was determined by dividing the weight in grams by the volume in cubic centimeters.

The foam compositions are shown on Table I. The results of physical testing are shown on Table II. Samples 1, 2, and 3 are outside of this invention because they use only one polymer in the base, part 1.

Part 1 and Part 2 were mixed together at a 1:1 ratio by weight. They were stirred together by hand until the two parts were homogeneous in color. The material was then poured into a 4"×6"×0.075" chase. The chase was backed with waxed butcher paper, which acted as the release coating. The chase was then deaired and placed into a Dake press to achieve the desired thickness. The slab was then cured for 24 hours at room temperature. Tensile, elongation and tear tests were based on ASTM D 412. Tensile and elongation were tested at 20 inches per minute. The tensile die was 0.25" and the tear die was tear die B. Durometer was based on ASTM D 2240.

Several samples of materials were prepared in which the two polymeric materials were varied in weight percent to show the effect on the physical properties of the elastomer.

TABLE I

| Wt % COMPO. | SAMPL1 | SAMPL2 | SAMPL3 | SAMPL4 | SAMPL5 | SAMPL6 | SAMPL7 | SAMPL8 |
|---|---|---|---|---|---|---|---|---|
| | | | | Part 1 | | | | |
| A(i) | 72.92 | | | 54.7 | | 54.7 | 54.7 | 55.84 |
| A(ii)b | | 72.92 | | 18.22 | 18.22 | | | |
| A(i)' | | | | | 54.7 | | | |
| A(ii)e | | | | | | | 18.22 | 18.60 |
| A(ii)c | | | 72.92 | | | 18.22 | | |
| E | 14.50 | 14.50 | 14.50 | 14.50 | 14.50 | 14.50 | 14.50 | 14.81 |
| F | 8.19 | 8.19 | 8.19 | 8.19 | 8.19 | 8.19 | 8.19 | 8.36 |
| D | 4.00 | 4.00 | 4.00 | 4.00 | 4.00 | 4.00 | 4.00 | 2.00 |
| C | 0.39 | 0.39 | 0.39 | 0.39 | 0.39 | 0.39 | 0.39 | 0.39 |
| | | | | Part 2 | | | | |
| B(i) | 71.30 | 71.30 | 71.30 | 71.30 | 71.30 | 71.30 | 71.30 | 71.30 |
| B(ii) | 24.00 | 24.00 | 24.00 | 24.00 | 24.00 | 24.00 | 24.00 | 24.00 |
| A(i) | 4.45 | 4.70 | 4.45 | 4.45 | 4.70 | 4.45 | 4.45 | 4.45 |
| G | 0.25 | | 0.25 | 0.25 | | 0.25 | 0.25 | 0.25 |

TABLE II

| | Physical Properties | | | | | | | |
|---|---|---|---|---|---|---|---|---|
| | SAMP1 | SAMP2 | SAMP3 | SAMP4 | SAMP5 | SAMP6 | SAMP7 | SAMP8 |
| Sheet density pcf | 12.4 | 25.4 | 17.7 | 13.0 | 13.2 | 11.6 | 10.7 | 14.7 |
| Tensile psi | 6.8 | 9.1 | 9.2 | 13.1 | 11.3 | 8.8 | 7.9 | 13.9 |
| Tear c ppi | 1.8 | 1.1 | .1 | 2.4 | 1.9 | 2.5 | 1.6 | 2.6 |
| Elongation % | 170 | 3.0 | 13.0 | 72.4 | 53.0 | 104.0 | 119 | 97 |

Example 2 (ELASTOMER)

The elastomer samples were fashioned by preparing a first composition by mixing together components A(i) and one or more of the components A(ii) with components, C, E, and pigment. This is part 1.

A second composition was prepared by mixing together compositions A(i) and one or more of the components A(ii) with components, B(ii) and E, and in some cases, as an inhibitor for the —SiH to vinyl addition reaction, (G). This is part 2.

The two materials were A(i) and A(ii)b. SAMPL9 is 100% A(i) and 0% A(ii)b. SAMPL10 is 96% A(i) and 4% A(ii)b. SAMPL11 is 93% A(i) and 7% A(ii)b. SAMPL12 is 88% A(i) and 12% A(ii)b, and SAMPL13 is 83% A(i) and 17% of A(ii)b. The formulations can be found on Table III and the testing results can be found on TABLE IV. Viscosity was based on ASTM D 1084 and Snap was based on Mil-S-23586. Tack free testing was based on CTM—0095.

TABLE III

| COMPONENTS Weight | SAMPL9 | SAMPL10 | SAMPL11 | SAMPL12 | SAMPL13 |
|---|---|---|---|---|---|
| A(i) | 65.17 | 62.57 | 60.61 | 57.30 | 54.09 |
| A(ii)b | 0 | 2.6 | 4.56 | 7.82 | 11.18 |
| E | 33.00 | 32.71 | 32.46 | 32.05 | 31.64 |
| C | 0.5 | 0.5 | 0.5 | 0.5 | 0.5 |
| B(ii) | 0.83 | 1.12 | 1.36 | 1.77 | 2.18 |
| pigment | 0.5 | 0.5 | 0.5 | 0.5 | 0.5 |
| Viscosity Avg. (P) | 1408 | 1190 | 1098 | 906 | 764 |
| Snap time (min.:sec.) | 5:00 | 5:30 | 5:30 | 5:30 | 7:40 |
| Tack Free Time (min.) | 13 | 15 | 17 | 17 | 25 |

TABLE IV

| Physical property | SAMPL9 | SAMPL10 | SAMPL11 | SAMPL12 | SAMPL13 |
|---|---|---|---|---|---|
| Tensile (psi) | 154 | 287 | 324 | 408 | 454 |
| Elongation % | 239 | 281 | 265 | 231 | 210 |
| Durometer | 21 | 23 | 24 | 28 | 30 |
| Tear die B (ppi) | 22.1 | 19.7 | 18.8 | 20.8 | 19.4 |
| 100% Modulus | 65.7 | 76.6 | 84.9 | 109.6 | 156.2 |

We claim:

1. A curable silicone composition comprising
    A. a non-resinous-siloxane base polymer system in which the polymers contain at least two vinyl groups per molecule which is a combination of:
        (i) high molecular weight siloxane polymers containing vinyl groups only on the terminal ends thereof and,
        (ii) second siloxane polymers containing vinyl groups selected from the group consisting essentially of:
            a. low molecular weight siloxane polymers having vinyl groups which are located only pendant thereon;
            b. low molecular weight siloxane polymers having vinyl groups which are located both pendant and on the terminal ends thereof;
            c. high molecular weight siloxane polymers having vinyl groups which are located only pendant thereon;
            d. high molecular weight siloxane polymers having vinyl groups which are located both pendant and on the terminal ends thereof, and
            e. low molecular weight siloxane polymers containing vinyl groups only on the terminal ends thereof;
    B. a silicon-containing crosslinker for the silicone base polymer system, said crosslinker containing at least two —SiH groups per molecule;
    C. a platinum group catalyst sufficient for curing the silicone composition and,
    D. a blowing agent for the composition.

2. A curable silicone composition comprising
    A. a non-resinous siloxane base polymer system in which the polymers contain at least two vinyl groups per molecule which is a combination of:
        (i) high molecular weight siloxane polymers containing vinyl groups only on the terminal ends thereof and,
        (ii) second siloxane polymers containing vinyl groups selected from the group consisting essentially of:
            a. low molecular weight siloxane polymers having vinyl groups which are located only pendant thereon;
            b. low molecular weight siloxane polymers having vinyl groups which are located both pendant and on the terminal ends thereof;
            c. high molecular weight siloxane polymers having vinyl groups which are located only pendant thereon;
            d. high molecular weight siloxane polymers having vinyl groups which are located both pendant and on the terminal ends thereof, and
            e. low molecular weight siloxane polymers containing vinyl groups only on the terminal ends thereof;
    B. a silicon-containing crosslinker for the silicone base polymer system, said crosslinker containing at least two —SiH groups per molecule and,
    C. a platinum group catalyst sufficient for curing the silicone composition.

3. A composition as claimed in claim 1 wherein there is additionally present at least one catalyst inhibitor.

4. A composition as claimed in claim 1 wherein there is additionally present at least one filler.

5. A composition as claimed in claim 1 wherein there is additionally present at least one foam stabilizing additive.

6. A composition as claimed in claim 2 wherein there is additionally present at least one catalyst inhibitor.

7. A composition as claimed in claim 2 wherein there is additionally present at least one filler.

* * * * *